United States Patent Office 2,947,539
Patented Aug. 2, 1960

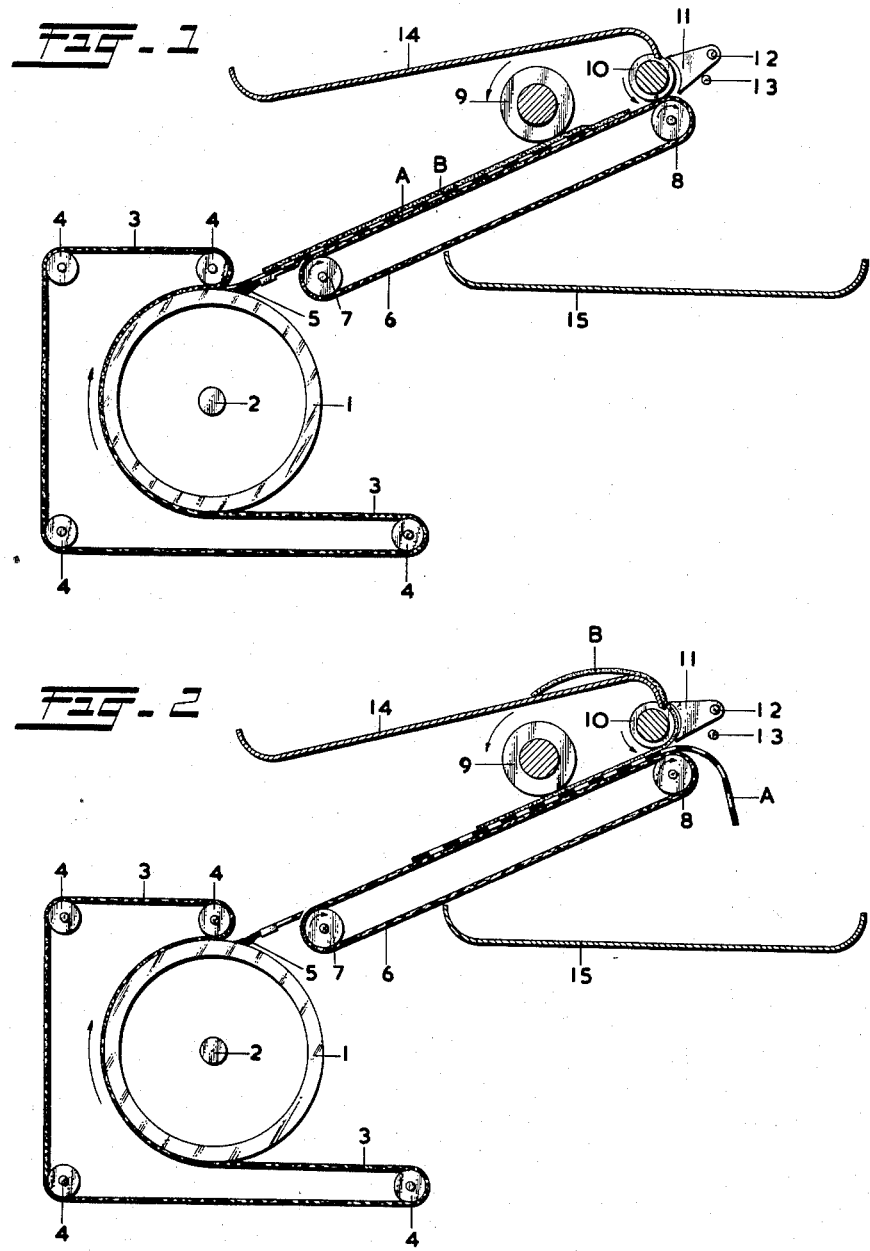

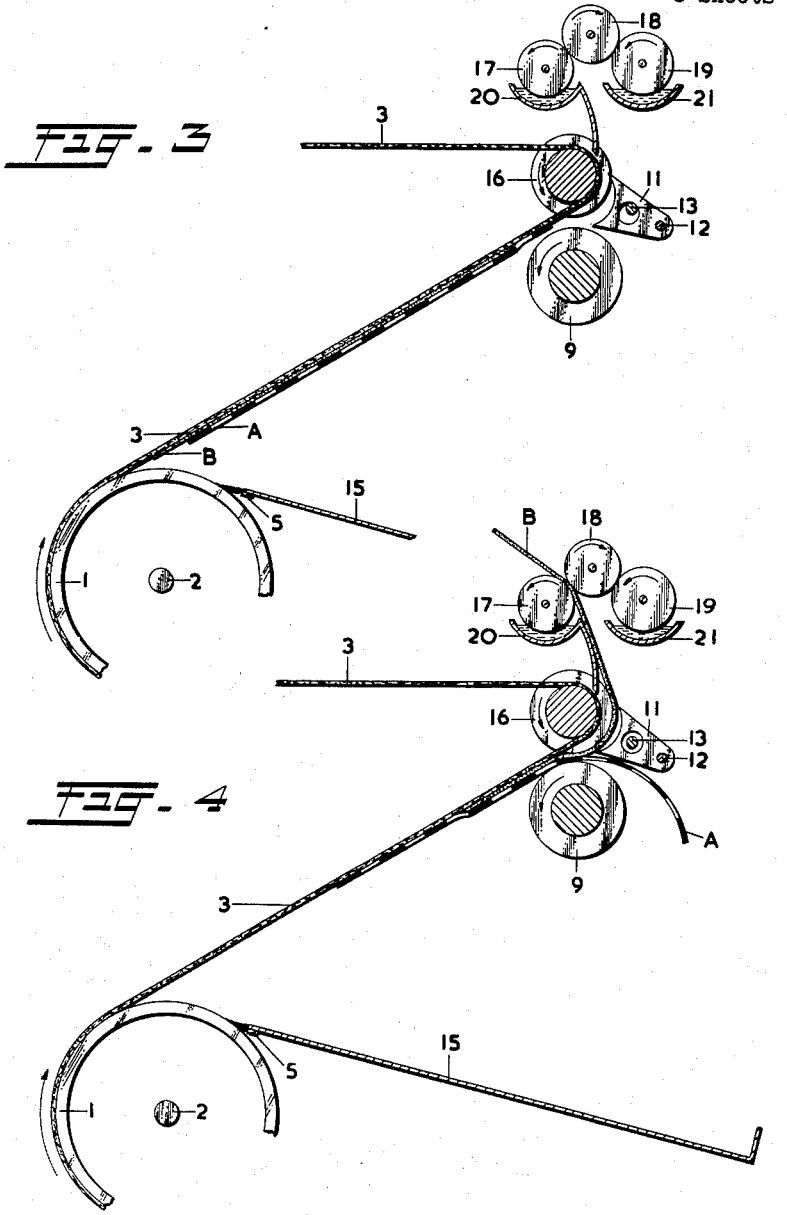

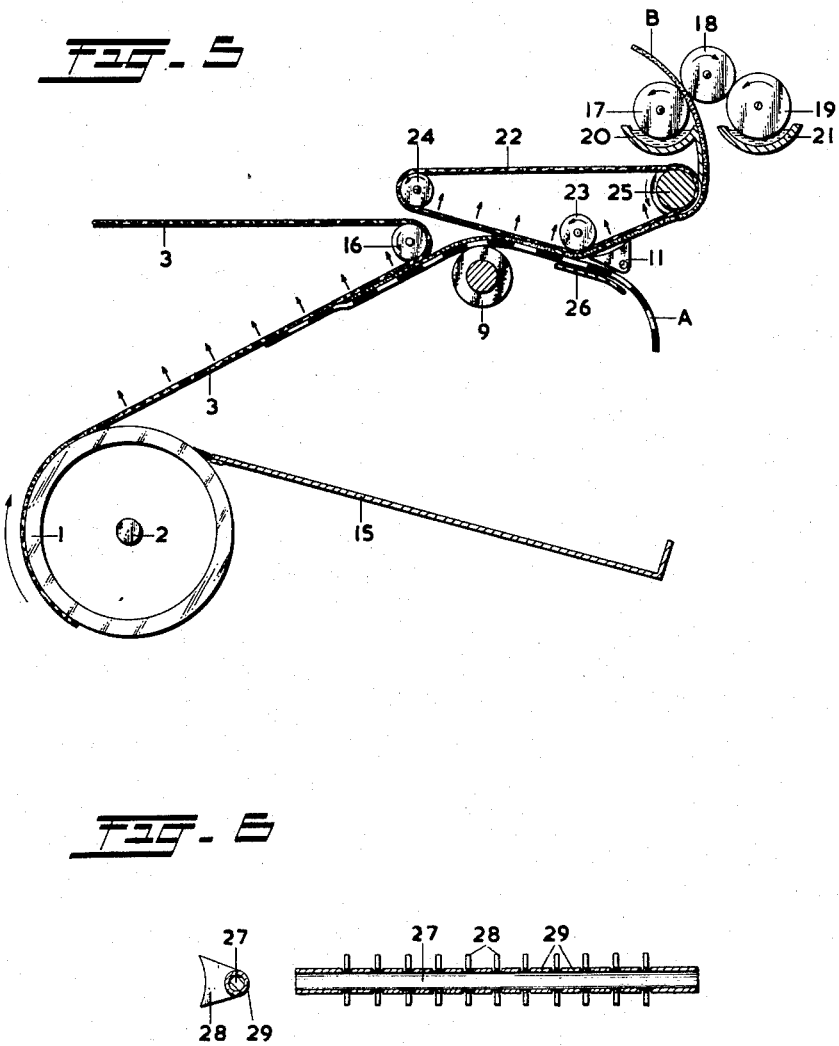

2,947,539
DEVICE FOR SEPARATING ORIGINAL AND COPY SHEETS

Theo Pierre Chrétien Breuers and Henricus Meyer, Venlo, Netherlands, assignors to Chemische Fabriek L. van der Grinten N.V., Venlo, Netherlands, a corporation of the Netherlands Filed Feb. 4, 1958, Ser. No. 713,224

Claims priority, application Netherlands Feb. 6, 1957

8 Claims. (Cl. 271—64)

This invention relates to an exposure apparatus for making heliographic prints, provided with a device for separating a sheet-shaped original and sheet-shaped copy-material (which form together an "exposure set") from each other after the exposure, which device comprises a two-legged tumbling element, the shaft of which extends parallel to the surface of the exposure set after the exposure, but transverse to the direction of movement thereof, and which through cooperation of one of its legs with a leading part of one of the sheets acts as a separator by guiding the original in a different direction from the copy-material.

A device of this kind is known in which the exposure set formed by original and copy-material is conveyed by a conveyor belt along and against the lower surface of an exposure panel. When the leading edge of this set has left the panel and the conveyor belt, it moves against the hanging leg of a two-legged tumbling element, which is thus moved. In consequence the other leg of the tumbling element grabs from above at the exposure set, and in doing so separates the upper sheet from the lower one. The separation, however, is only effected in the right way if the lower sheet in the set leads sufficiently, for only then can the tumbling element grab at the set with the other leg before it is reached by the edge of the upper sheet of the set.

This means that the set has to be composed in the right way before it is fed into the exposure apparatus, namely, always with a sufficient length of the copy-material projecting ahead of the original. This makes special demands upon the operation of the apparatus and involves a loss of light-sensitive material.

It is an object of the present invention to give one of the sheets, but not until after it has left the exposure section of the apparatus, a leading part projecting beyond the other sheet, while avoiding the requirement to have a leading part of the copy-material project beyond the original already before the introduction into the exposure apparatus, and also to provide for a reliable separation when the leading part of one of the sheets projecting beyond the other sheet is large. Another object is to provide the possibility of separating several exposure sets which leave the exposure section of the apparatus in echelon.

According to the present invention there is provided exposure apparatus for making heliographic prints, provided with a device for separating a sheet-shaped original and sheet-shaped copy-material (which together form the exposure set) from each other after the exposure, which comprises means for effecting exposure of said copy-material to said original and for conveying the said copy and original in superposition from the exposure position, a two-legged tumbling element the shaft of which extends parallel to the surface of the exposure set after the exposure, but transverse to the direction of movement thereof, and which through cooperation of one of its legs with a leading part of one of the sheets acts as a separator by guiding the original in a different direction from the copy-material and along the path followed by the exposure set after the exposure, in advance of the tumbling element a friction element whose operation is independent of the passing of the exposure set and which exerts upon the exposure set a frictional force such that the sheets are shifted relative to each other in the direction of movement of the set.

The relative shifting of the sheets can be achieved by accelerating, relative to the other sheet, the sheet which is to be given a leading part or the leading part of which is to be increased, or by decelerating the said other sheet relative thereto. Acceleration of one sheet relative to the other is obtained by bringing it into contact with a friction surface moving in the same direction as the sheet, the speed of which is greater than that of the sheet. Deceleration of the other sheet can be obtained by bringing that sheet into contact with a stationary friction element, e.g. a rigidly mounted rubber plate or a number of stationary rubber fingers, or by bringing the sheet into contact with such a friction surface or another friction surface, which is moving. Its movement may be counter to that of the sheet concerned, or in the same direction. In the latter case the speed of movement of the friction surface has to be smaller than that of the sheet.

Whatever may be the action of the friction surface, whether it is stationary or moving, whether is causes an acceleration of one sheet or a deceleration of the other sheet, the mutual friction between the two sheets ("stiction") must always be smaller than the friction between the friction element and the sheet coming into contact with this element, and smaller than the friction between the other sheet and the conveying- or guiding-means coming into contact with the latter. Sufficient friction between the friction element and the sheet-shaped material is obtained, for example, by roughening the surface of the friction element or, better still, by coating it with rubber or a similar material. In a similar way sufficient friction can be obtained between the conveying- or guiding-means and the other sheet-shaped material.

As a moving friction element a rotating friction roller is preferably employed. If the sheet coming into contact with the friction roller has to be accelerated, the circumferential speed of the roller has to be greater than the speed of movement of the exposure set, if on the other hand it has to be decelerated, the circumferential speed of the roller has to be smaller; the roller can also be stationary or even counter-rotating.

A form of apparatus is known which makes use of a friction roller for separating the set of original and copy leaving an exposure apparatus. In the known device the sheets which form the exposure set are separated from each other by means of a counter-rotating friction roller, after the latter has originally functioned as a co-rotating guiding roller. The co-rotating movement of the friction roller is converted into a counter-rotating movement as soon as a given leading part of the exposure set, after passing the roller, changes over the drive of the roller by means of an electrical feeler. Since the exposure set is driven towards the friction roller by means of a pair of conveying rollers, while another roller near the friction roller drives the lower side of the set in its direction of movement, the upper sheet of the set is bent upwards in the form of a loop by the resistance of the friction roller and then guided along a different path from the lower sheet. The known device has the drawback of a complicated construction. Moreover, both sheets may be "rubbed back" by the counter-rotating friction roller if the lower sheet projects farther beyond the other than the distance between friction roller and feeler. If several exposure sets, in which the lower sheet projects beyond the other, are fed side by side into the apparatus in echelon, the sheets of the set arriving first can indeed be separated from each other, but those of the following sets cannot. In fact, when the following exposure sets arrive, the friction roller is already counter-rotating, so that the sets arriving later are completely "rubbed back."

Several embodiments of exposure apparatus according to the invention are illustrated in the accompanying drawings in which:

Figure 1 is a diagrammatic cross-section of an exposure apparatus with a device for separating the sheets, in which the relative shifting of the sheets is obtained by accelerating the movement of one of the sheets.

Figure 2 shows the same apparatus as Figure 1 at a moment in which the sheets have been partly separated from each other and are being guided in different directions.

Figure 3 is a diagrammatic cross-section of a combined exposure and developing apparatus in which the relative shifting of the sheets is effected by slowing down the movement of one of the sheets.

Figure 4 shows the apparatus according to Figure 3 at a moment in which the sheets have been partly separated from each other and are being guided in different directions.

Figure 5 is a diagrammatic cross-section of a combined exposure and developing apparatus with a device for separating the sheets mounted between the exposure and the developing section, in which device the conveying surface has been bent about the friction element.

Figure 6 shows a longitudinal and a cross-section of an embodiment of a tumbling element.

The apparatus according to the Figures 1 and 2 has an exposure section which consists of rotating exposure cylinder 1, light source 2, endless apron 3, and guiding rollers 4. The exposure set, consisting of the transparent original A and the light-sensitive sheet B, is pressed between the outer surface of cylinder 1 and apron 3 and conveyed around light-source 2. After thus having been exposed, the two sheets A and B are guided by means of a lifting brush 5 to a conveyor-belt system, which operates at the same speed as apron 3 and which consists of the endless conveyor belt 6 and the guiding rollers 7 and 8.

Mounted above conveyor belt 6 is a rotating friction roller 9, with which the exposure set comes into contact when passing it. Its direction of rotation is indicated by an arrow. The circumferential speed of friction roller 9 is considerably greater, e.g. 4 to 5 times as great as the speed of movement of conveyor belt 6 and of the exposure set lying on it. Because of this difference in speed roller 9 exerts a frictional force on the exposure set, in consequence of which sheet B is moved along original A. The leading edge of sheet B will thus project (or project further) beyond original A (see Figure 1). After reaching the rollers 8 and 10, the sheet is conveyed further by these rollers. Even when the sheets A and B are not in register, or when the two sheets do not have the same length so that, for example, original A, when reaching roller 9, has a leading part projecting beyond sheet B, yet provided the circumferential speed of the roller 9 the distance between roller 9 and the rollers 8 and 10 are great enough, sheet B will reach the rollers 8 and 10 sooner than original A.

Mounted behind the rollers 8 and 10 is a tumbling element 11, which is rotatable on shaft 12 and which in its position of rest is supported by rod 13 (see Figure 1). After having passed the rollers 8 and 10, sheet B is bent around roller 10 by tumbling element 11 and guided in the direction of delivery tray 14; in this way it puts the tumbling element 11 into its working position (see Figure 2). In this position the lower end of the tumbling element scrapes along the passing sheet B, in consequence of which original A, which arrives later, cannot move along with sheet B, but is guided past the lower side of tumbling element 11 to collecting tray 15.

The apparatus described above is suitable for use with sheets of which the maximum length is such that their leading edges come just within reach of the friction roller when their trailing edges have completely left the exposure section.

The frictional force which roller 9 exerts on the exposure set need only be small. It is difficult if it is able to overcome the frictional force which tends to hold the sheets A and B against relative movement.

Naturally, when original A projects beyond sheet B, the frictional force on the leading part of original A must not be greater than the force that would be necessary to shift original A along conveyor belt 6. The frictional force of roller 9 can be limited by constructing the roller as a so-called "disc roller," for example, with thin discs of 1 mm. thickness. The discs consist, for example, of rubber or of an elastic synthetic resin, for example, Mipolam manufactured by Dynamit A.G., Troisdorf, Germany.

Instead of the friction roller 9 other friction elements may be used, for example, rubber fingers, which are moved quickly to and fro above conveyor belt 6 and which act on the exposure set lying on the belt only during their forward movement.

In the apparatus according to Figures 1 and 2 the friction element may touch the conveyor belt 6 when no sheet-shaped material is fed through the apparatus. It may also be mounted at a short distance from the belt, for example, at a distance which is slightly larger than the thickness of original A. In that case it cannot exert a frictional force on original A. In practice, however, originals and light-sensitive materials of varying thickness are often fed through exposure apparatuses.

For this reason, in a special embodiment of the invention which has a conveying surface extending between the exposure section of the apparatus and the tumbling element, which surface supports the moving exposure set, members are present near the friction element which lift the exposure set off the conveying surface and bring it under the influence of the friction element.

In this embodiment the distance between friction element and conveying surface may be larger than the thickness of the exposure set, and exposure sets of varying thickness can be separated in a reliable manner.

Such an embodiment is illustrated in diagrammatic cross-section in Figures 3 and 4. In these figures the exposure set is conveyed around the light-source 2 mounted in cylinder 1 by means of a number of laterally juxtaposed conveyor belts 3. After leaving the exposure section, the light-sensitive sheet B is sucked onto, or blown against, the conveyor belts 3 (by means not shown) and conveyed in the upward direction by these belts. In many cases original A will become disengaged from sheet B, owing to gravity when leaving the exposure section, and fall into collecting tray 15. However, if original A has a leading part projecting beyond sheet B, which is held against the belts 3, or if it sticks to sheet B through any other cause (for example, owing to static electricity), the two sheets are conveyed by the conveyor belts 3 as shown in Figure 3.

The conveyor belts 3 bend around disc roller 16, on which the discs have been so mounted that they are located between the belts 3. Mounted almost exactly below disc roller 16 is a rotating friction roller 9, at a distance from the conveyor belts 3 which is greater than the thickness of the exposure set. After passing roller 9, the set is lifted from the belts 3 by the discs of roller 16 and pressed against roller 9. Instead of discs which are mounted on a roller, other means may also be used to lift the exposure set off the conveying surface and press it against the friction roller. Suitable means for this are, for example, small stationary plates which project between the belts 3. It is also possible to mount behind the belts 3 (in Figure 3 in the top right-hand corner) a row of blowing nozzles. These blow air through the interspaces between the belts, blow the set loose from the belts 3, and bring it under the influence of friction roller 9. On original A, which comes into contact with roller 9, a frictional force is exerted which arrests the movement of this original or even moves it backwards along sheet B. In this way sheet B is given a leading part projecting beyond original A, which puts tumbling element 11 into the working position. The sheet is bent around roller 16 by the tumbling element and guided to the developing section, which consists of the liquid-applying rollers 17 and 18, liquid-transmitting roller 19, and the liquid-troughs 20 and 21.

While original A is arrested, sheet B moves behind and past sheet A. At the trailing end of the set a steadily increasing part of original A comes into contact with the belts 3 and is sucked against them. At first the belts 3 slip over the part of original A that is in contact with them, but when this part has become sufficiently large, the original is taken along by the belts against the frictional force of roller 9. The original then starts passing friction roller 9; through the scraping action of the tumbling element it is separated from sheet B and guided along the lower side of tumbling element 11 to collecting tray 15 (see Figure 4).

The apparatus just described operates in a reliable manner. Even if original A, in reaching friction roller 9, projects beyond sheet B over a distance which is greater than the distance between friction roller 9 and tumbling element 11, and the projecting leading part of original A is carried along against the friction of roller 9 to between roller 16 and tumbling element 11, a reliable separation of the sheets takes place. In fact, the force with which the leading part of the original is sucked against the belts disappears entirely as soon as sheet B reaches roller 16. Moreover, the original is then pressed with greater force against the friction roller. The latter can now exert such a great frictional force on the original that it is rubbed back and its leading part, which possibly had already put the tumbling element in the working position, is drawn from between said element and roller 16. After this, sheet B keeps the tumbling element in the working position, so that original A, when passing the roller 9 for the second time, is separated along the lower side of tumbling element 11.

In another valuable embodiment of the invention a conveying surface extends between the exposure section of the apparatus and the tumbling element, which surface supports the moving exposure set and is formed by two successive conveyor belts which cooperate in such a way that the conveying surface is bent about the friction element, while the conveyor belt which is nearer to the tumbling element has a greater speed of movement than the other.

In Figure 5 such an embodiment is illustrated in diagrammatic cross-section. The conveying surface against which the light-sensitive sheet B and original A are kept by means of a difference in air pressure and against which they are conveyed to the tumbling element, consists of two successive conveyor-belt systems mounted at an angle relative to each other, within the arms of which angle the friction element is mounted. One system forms part of the exposure section and consists of a number of laterally juxtaposed endless belts with spaces therebetween, or consists of a single perforated endless conveyor belt 3 as well as a guiding roller 16 and other guiding rollers (not shown); the other system consists of endless belts or a belt 22 and guiding rollers 23, 24 and 25. Behind the two conveyor-belt systems air is sucked away by means of a fan in the direction of the arrows shown in the figure. An exposure set conveyed by the conveyor-belt system 3 leaves this system near roller 16 (here there is no difference in air pressure any longer) and continues its way against the belt(s) 22. Since the two conveyor-belt systems form an angle with each other and the speed of the belt(s) 22 is greater than that of the belt(s) 3, the exposure set is stretched while it lies against the two belt systems, so that the original A comes into contact with friction element 9. Owing to the frictional force which this element exerts on the original the speed of the latter is reduced, so that the light-sensitive sheet B moves behind and past the original and gets a leading part projecting beyond the original. This leading part is engaged by tumbling element 11 and traverses with belt(s) 22 the angle near roller 23 in the direction of the developing section. The tumbling element is thus put from the position of rest (in which it is supported by the guiding plate 26) into the working position (as shown in Figure 5). The original A arriving later cannot follow the bending of sheet B near roller 23 and moves between the lower side of tumbling element 11 and guiding plate 26 to collecting tray 15.

In all the forms of apparatus described above the tumbling element may consist of a single tumbler, but it is also possible to mount a number of tumblers adapted to move independently of each other on one common shaft. An embodiment of such a tumbling element is represented in Figure 6 in longitudinal section and in cross-section. In this figure, 27 is a shaft which extends over the whole width of the apparatus. Rotatably mounted on this shaft are a number of tumblers 28, which are spaced apart by collars 29. Such a tumbling element may be advantageously employed in cooperation with continuously operating exposure apparatus, through which several exposure sets are fed side by side in echelon.

What we claim is:

1. An apparatus for separating superimposed original and copy sheets passing in face to face relation from a place of exposure, comprising means for conveying said sheets endwise into a separation station with at least the leading edge of one sheet disposed on and behind the leading edge of another sheet, a two-legged tumbling element mounted rockably at said station, the end of one leg of said element normally lying across the path of the forward one of said leading edges, said element having between the ends of said legs a surface normally in a position to be engaged by said forward edge and movable thereby to rock said element and thus move said one leg out of said path and move the end of the other leg of said element across the path of approach of the backward one of said edges, whereby said edges and the sheets are diverted into separate paths.

2. An apparatus for separating superimposed original and copy sheets passing in face to face relation from a place of exposure, comprising means for conveying said sheets endwise into a separation station with at least the leading edge of one sheet disposed on and behind the leading edge of another sheet, a two-legged tumbling element mounted at said station for rocking movement on an axis parallel to the plane, but transverse to the direction, of the approach of said sheets, both legs of said element extending away from said axis to one side thereof and toward said conveying means, the end of one leg of said element normally lying across the path of the forward one of said leading edges, said element having between the ends of said legs a surface normally in a position to be engaged by said forward edge and movable thereby to rock said element and thus move said one leg out of said path and move the end of the other leg of said element across the path of approach of the backward one of said edges, whereby said edges and the sheets are diverted into separate paths.

3. An apparatus for separating superimposed original and copy sheets passing in face to face relation from a place of exposure, comprising means for conveying said sheets endwise into a separation station with at least the leading edge of one sheet disposed on and behind the leading edge of another sheet, a two-legged tumbling element mounted rockable at said station on a fixed axis, both legs of said element extending to one side of said axis and toward said conveying means, the end of one leg of said element normally lying across the path of the forward one of said leading edges, said element having between the ends of said legs a surface normally in a position to be engaged by said forward edge and movable thereby to rock said element and thus move said one leg out of said path and move the end of the other leg of said element across the path of approach of the backward one of said edges, whereby said edges and the sheets are diverted into separate paths, said surface being a concave surface extending between the ends of said legs and operative to guide and deflect said forward edge through a curved path leading upwards and away from the path of said backward edge.

4. An apparatus for separating superimposed original and copy sheets passing in face to face relation from a place of exposure, comprising means for conveying said sheets endwise into a separation station, a two-legged tumbling element mounted at said station for rocking movement on an axis parallel to the plane, but transverse to the direction, of the approach of said sheets, means acting continuously upon one of said sheets on said conveying means, over the length of said one sheet, for displacing said one sheet endwise relative to the other sheet as said sheets are conveyed to said tumbling element, so as to disposed at least the leading edge of one sheet on and behind the leading edge of the other sheet, one leg of said tumbling element normally lying in the path of approach of the forward one of said leading edges, said element being rockable by said forward edge to move the other leg of said element across the path of approach of the backward one of said leading edges and thus divert said edges and the sheets into separate paths.

5. An apparatus for separating superimposed original and copy sheets passing in face to face relation from a place of exposure, comprising means for conveying said sheets endwise into a separation station, a two-legged tumbling element mounted at said station for rocking movement on an axis parallel to the plane, but transverse to the direction, of the approach of said sheets, a friction member acting continuously upon one of said sheets on said conveying means, over the length of said one sheet, to displace said one sheet endwise relative to the other of said sheets and thus dispose at least the leading edge of one of said sheets on and behind the leading edge of the other sheet as the sheets are moved to said tumbling element by said conveying means, one leg of said tumbling element normally lying in the path of the forward one of said leading edges, said element being rockable by said forward edge to move the other leg of said element across the path of approach of the backward one of said leading edges and thus divert said edges and the sheets into separate paths.

6. An apparatus as described in claim 5, said conveying means comprising a moving conveyer belt surface that supports said sheets, said friction member being a rotating friction roller mounted in a fixed position opposite said belt surface to engage the one of said sheets farther from said surface.

7. An apparatus as described in claim 5, said conveying means comprising a moving conveyor surface that supports said sheets, said friction member being spaced from said surface by a distance at least as great as the thickness of the superimposed sheets, and means located near said friction member for lifting said sheets from said conveyor surface to subject the sheet nearer to said member to the frictional action of said member.

8. An apparatus as described in claim 5, said conveying means comprising two successive conveyor belt flights having their conveying surfaces disposed at an angle one to the other and spaced apart to form a gap in the path of movement of said sheets to said tumbling element, said friction member being located at said gap to engage and bend the sheets passing between said flights, and means for moving the flight nearer to said tumbling element at a speed greater than the speed of the other flight.

References Cited in the file of this patent
UNITED STATES PATENTS

| | | |
|---|---|---|
| 740,592 | Schock | Oct. 6, 1903 |
| 1,758,612 | Langsner | May 13, 1930 |
| 2,317,655 | Broek | Apr. 27, 1943 |
| 2,441,912 | Streich | May 18, 1948 |
| 2,766,044 | Schulze | Oct. 9, 1956 |

Disclaimer 2,947,539.—*Theo Pierre Chrétien Breuers*, and *Henricus Meyer*, Venlo, Netherlands. DEVICE FOR SEPARATING ORIGINAL AND COPY SHEETS. Patent dated Aug. 2, 1960. Disclaimer filed Apr. 29, 1963, by the assignee, *Chemische Fabriek L. van der Grinten N.V.*

Hereby enters this disclaimer to claims 1, 2, and 3, of said patent.
[*Official Gazette September 10, 1963*]